US012663872B2

(12) United States Patent (10) Patent No.: US 12,663,872 B2
Chen (45) Date of Patent: Jun. 23, 2026

(54) HAPTIC FEEDBACK METHOD AND HAPTIC FEEDBACK DEVICE

(71) Applicants: BEIJING BOE TECHNOLOGY DEVELOPMENT CO., LTD., Beijing (CN); BOE Technology Group Co., Ltd., Beijing (CN)

(72) Inventor: Yuju Chen, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/992,262

(22) PCT Filed: Mar. 13, 2024

(86) PCT No.: PCT/CN2024/081508
§ 371 (c)(1),
(2) Date: Jan. 8, 2025

(87) PCT Pub. No.: WO2024/222269
PCT Pub. Date: Oct. 31, 2024

(65) Prior Publication Data
US 2026/0010231 A1 Jan. 8, 2026

(30) Foreign Application Priority Data
Apr. 24, 2023 (CN) .......................... 202310457272.3

(51) Int. Cl.
G06F 3/041 (2006.01)
G06F 3/01 (2006.01)
(52) U.S. Cl.
CPC ............ G06F 3/016 (2013.01); G06F 3/0416 (2013.01)

(58) Field of Classification Search
CPC ............................... G06F 3/016; G06F 3/0416
See application file for complete search history.

(56) References Cited

U.S. PATENT DOCUMENTS

2014/0132568 A1* 5/2014 Hirose .................... G06F 3/044
345/175
2015/0235447 A1* 8/2015 Abovitz .............. G06F 3/04883
345/633
(Continued)

FOREIGN PATENT DOCUMENTS

CN 109240485 A 1/2019
CN 109284005 A 1/2019
(Continued)

*Primary Examiner* — Robert J Michaud
(74) *Attorney, Agent, or Firm* — WHDA, LLP

(57) ABSTRACT

A haptic feedback method and a haptic feedback device. The haptic feedback method is applied to the haptic feedback device including a touch display panel and an actuator assembly, and the haptic feedback method includes: acquiring touch information and display information on the touch display panel, the touch information includes a touch position of a touch object on the touch display panel, the display information includes information of a display object displayed on the touch display panel, and the touch position is within the display object; and generating a driving signal according to the touch information, the display information, and surface characteristic parameters of the display object, the driving signal output to the actuator assembly, so that the actuator assembly drives the touch display panel to vibrate and form haptic feedback on the surface of the touch display panel.

16 Claims, 7 Drawing Sheets

(56) References Cited

U.S. PATENT DOCUMENTS

| | | | | |
|---|---|---|---|---|
| 2017/0011210 A1* | 1/2017 | Cheong | .................. | A61B 5/681 |
| 2022/0252550 A1* | 8/2022 | Catsis | .................. | B06B 1/0207 |
| 2023/0185378 A1* | 6/2023 | Chen | .................. | G06F 3/04886 |
| | | | | 345/173 |

FOREIGN PATENT DOCUMENTS

| | | | | | |
|---|---|---|---|---|---|
| CN | 109284005 B | * | 1/2021 | ............ | G06F 3/014 |
| CN | 114860078 A | | 8/2022 | | |
| CN | 115244490 A | | 10/2022 | | |

* cited by examiner

Acquire touch information and display information on the touch display panel, the touch information includes a touch position of the touch object on the touch display panel, and the display information includes information of a display object displayed on the touch display panel, and the touch position is located within the display object — S01

Generate a drive signal according to the touch information, the display information, and surface characteristic parameters of the display object, output the drive signal to the actuator assembly, so that the actuator assembly drives the touch display panel to vibrate and form haptic feedback on the surface of the touch display panel 31 — S02

FIG. 4b

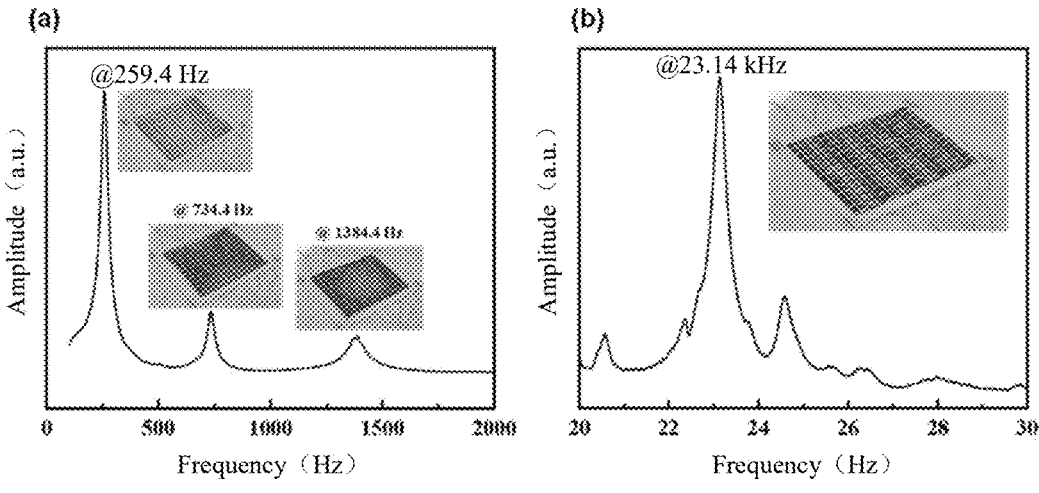

Moving
speed v

5mm

5mm

HAPTIC FEEDBACK METHOD AND HAPTIC FEEDBACK DEVICE

CROSS-REFERENCE TO RELATED APPLICATIONS

This application claims priority to Chinese patent application No. 202310457272.3, titled "HAPTIC FEEDBACK METHOD AND HAPTIC FEEDBACK DEVICE", submitted to the China National Intellectual Property Administration on Apr. 24, 2023, the entire contents of which are incorporated herein by reference.

TECHNICAL FIELD

The present disclosure relates to the field of electronic technology, and in particular to a haptic feedback method and a haptic feedback device.

BACKGROUND

Haptic feedback is a cutting-edge technology in the fields of virtual reality and human-computer interaction. Multimedia terminals such as smartphones and tablet computers using haptic feedback technology have broad application prospects in fields like education, entertainment, and medical treatment. Through haptic feedback technology, users can perceive haptic features such as the surface shape, texture, and roughness of visual objects, thereby enriching users' interactive experiences.

SUMMARY

The present disclosure provides a haptic feedback method, applied to a haptic feedback device including a touch display panel and an actuator assembly, the haptic feedback method includes:

acquiring touch information and display information on the touch display panel, the touch information includes a touch position of a touch object on the touch display panel, and the display information includes information about a display object displayed on the touch display panel, the touch position being located within the display object;

generating a drive signal according to the touch information, the display information, and surface characteristic parameters of the display object, the drive signal is output to the actuator assembly so that the actuator assembly drives the touch display panel to vibrate and form haptic feedback on a surface of the touch display panel.

In some embodiments, the drive signal includes a first drive signal and a second drive signal in different time periods, and an amplitude of the first drive signal is greater than the amplitude of the second drive signal; the surface characteristic parameters include a surface friction coefficient, the display object includes a first display object and a second display object, the surface friction coefficient of the first display object is less than the surface friction coefficient of the second display object; the generating a drive signal according to the touch information, the display information, and surface characteristic parameters of the display object includes:

in response to the touch position being located within the first display object, generating the first drive signal according to the touch information, the display information, and the surface friction coefficient of the first display object;

in response to the touch position being located within the second display object, generating the second drive signal according to the touch information, the display information, and the surface friction coefficient of the second display object.

In some embodiments, the first display object and the second display object are periodically and alternately arranged in a first direction, and the first direction is a moving direction of the touch position;

the first drive signal includes a first modulation signal and a first carrier signal that are superimposed on each other, and the second drive signal includes a second modulation signal and a second carrier signal that are superimposed on each other, the first modulation signal and the second modulation signal are two signals in different time periods of a same modulation signal.

In some embodiments, an envelope of the drive signal includes an antinode and a node, the first drive signal includes the antinode, and the second drive signal includes the node.

In some embodiments, the drive signal is a pulse signal; the surface characteristic parameters include a surface friction coefficient; the display object includes a first display object and a second display object that are alternately arranged in a first direction; the surface friction coefficient of the first display object is less than the surface friction coefficient of the second display object; the first direction is a moving direction of the touch position; the generating a drive signal according to the touch information, the display information, and surface characteristic parameters of the display object includes:

in response to the touch position being located within the first display object, generating an effective signal of the pulse signal according to the touch information, the display information, and the surface friction coefficient of the first display object.

In some embodiments, a duty cycle of the pulse signal is positively correlated with a ratio of widths of the first display object and the second display object in the first direction.

In some embodiments, the touch information further includes a pressure parameter of the touch object on the touch display panel, the pressure parameter includes a touch pressure and/or parameters characterizing a magnitude of the touch pressure, the generating a drive signal according to the touch information, the display information, and surface characteristic parameters of the display object includes:

in response to the pressure parameter being greater than or equal to a preset threshold, generating the drive signal according to the touch information, the display information, and the surface characteristic parameters of the display object, the preset threshold is a critical value of the pressure parameter for distinguishing between accidental touch operations and non-accidental touch operations.

In some embodiments, after generating the drive signal, the method further includes:

acquiring a deformation amount of the touch display panel due to a vibration driven by the actuator assembly; and adjusting the drive signal according to the deformation amount.

In some embodiments, the display object includes a plurality of first display objects arranged along a first direction and having the same surface friction coefficient, the first direction is a moving direction of the touch position, the drive signal includes a plurality of first drive signals in different first time periods, the first time period is a period during which the touch position is located within the same one of the first display objects, the generating a drive signal according to the touch information, the display information, and surface characteristic parameters of the display object includes:

in response to the first direction being a direction from a foreground to a background, generating a plurality of first drive signals with gradually decreasing amplitudes according to the touch information, the display information, and the surface characteristic parameters of the display object;

in response to the first direction being a direction from the background to the foreground, generating a plurality of first drive signals with gradually increasing amplitudes according to the touch information, the display information, and the surface characteristic parameters of the display object.

In some embodiments, the surface characteristic parameters of the display object include at least one of: a surface friction coefficient, surface roughness, and surface flatness.

In some embodiments, the drive signal includes a modulation signal and a carrier signal that are superimposed on each other, the generating a drive signal according to the touch information, the display information, and surface characteristic parameters of the display object includes:

generating the modulation signal according to the touch information and the display information;

generating the carrier signal according to the surface characteristic parameters of the display object, wherein the carrier signal is used for forming a squeeze air film effect between the touch object and the touch display panel; and obtaining the drive signal by synthesizing the modulation signal and the carrier signal.

In some embodiments, the touch information includes touch positions of the touch object at a plurality of moments, the generating the modulation signal according to the touch information and the display information includes:

calculating a moving speed of the touch object in a first direction according to the touch positions of the touch object at at least two moments;

obtaining a modulation frequency of the modulation signal according to a width of the display object in the first direction and the moving speed; and generating the modulation signal according to the modulation frequency.

In some embodiments, the calculating a moving speed of the touch object in a first direction according to the touch positions of the touch object at at least two moments includes:

obtaining a moving distance of the touch object between two adjacent moments according to the touch positions of the touch object at the two adjacent moments;

obtaining a first speed by calculating a ratio of the moving distance to a time interval between the two adjacent moments; and obtaining the moving speed by calculating an average value of a plurality of the first speeds.

In some embodiments, the obtaining the modulation frequency of the modulation signal according to a width of the display object in the first direction and the moving speed includes:

obtaining a first duration by calculating a ratio of the width of the display object in the first direction to the moving speed; and determining a reciprocal of the first duration as the modulation frequency.

In some embodiments, a frequency of the carrier signal is greater than or equal to 20 kHz.

The present disclosure provides a haptic feedback device, including:

a touch display panel;

an actuator assembly arranged on at least one side of the touch display panel; and a drive component, the drive component is connected to the touch display panel and the actuator assembly respectively, and is configured to: acquire touch information and display information on the touch display panel, the touch information including a touch position of a touch object on the touch display panel, the display information including information of a display object displayed on the touch display panel, the touch position being located within the display object; and generate a drive signal according to the touch information, the display information, and surface characteristic parameters of the display object, the drive signal is output to the actuator assembly, so that the touch display panel is driven by the actuator assembly to vibrate and form haptic feedback on a surface of the touch display panel.

In some embodiments, the haptic feedback device further includes at least one of:

an amplification circuit, wherein the amplification circuit is connected to the drive component and the actuator assembly respectively, and is configured to amplify the drive signal output by the drive component and send the amplified signal to the actuator assembly;

a first sensing component, wherein the first sensing component is arranged on one side of the touch display panel, and is configured to sense a pressure parameter of the touch object on the touch display panel and send the pressure parameter to the drive component, the pressure parameter includes a touch pressure and/or parameters characterizing a magnitude of the touch pressure; and a second sensing component, wherein the second sensing component is arranged on one side of the touch display panel, and is configured to sense a deformation amount of the touch display panel due to a vibration driven by the actuator assembly, and send the deformation amount to the drive component.

In some embodiments, a vibration mode adopted by the actuator assembly for driving the touch display panel to vibrate is a standing wave vibration mode.

In some embodiments, a half-wavelength of the standing wave vibration mode is less than or equal to 20 mm.

The above description is only an overview of the technical solution of the present disclosure. In order to learn technical means of the present disclosure more clearly and allow the technical means to be implemented based on the disclosure of the description, and in order to make the above and other objects, features and advantages of the present disclosure more apparent and understandable, specific embodiments of the present disclosure are illustrated below.

BRIEF DESCRIPTION OF THE DRAWINGS

In order to describe technical solutions of the embodiments of the present disclosure or the related art more clearly, the accompanying drawings used in the illustration of the embodiments or the related art will be briefly intro-
duced. Apparently, the accompanying drawings in the fol-
lowing explanation illustrate merely some embodiments of
the present disclosure, and those skilled in the art may obtain
other accompanying drawings based on these accompanying
drawings without paying any creative effort. It should be
noted that the scales in the accompanying drawings are only
for illustration and do not represent the actual scales.

FIG. 4*b* shows a flowchart of a haptic feedback method
provided by the present disclosure;

FIG. 5 shows simulation results of vibrations of the touch
display panel when driven by an actuator assembly with
signals of different frequencies;

DETAILED DESCRIPTION

A clear and thorough description for solutions in the
embodiments of the present disclosure will be given below
in conjunction with the accompanying drawings in the
embodiments of the present disclosure. Apparently, the
described embodiments are a part of embodiments of the
present disclosure, not all the embodiments. All other
embodiments obtained, based on the embodiments in the
present disclosure, by those skilled in the art without paying
creative effort fall within the protection scope of the present
disclosure.

Figure 1:
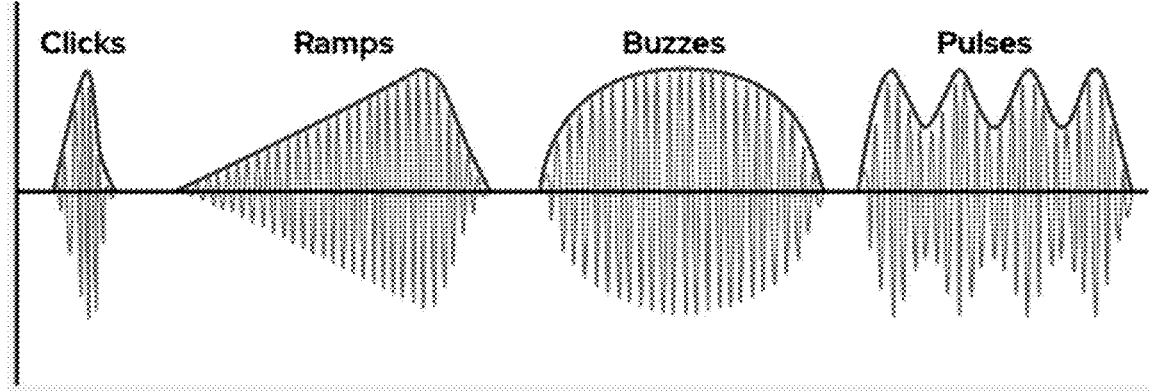
FIG. 1 shows several vibration modes in the traditional
haptic feedback technology.
Figure 2:
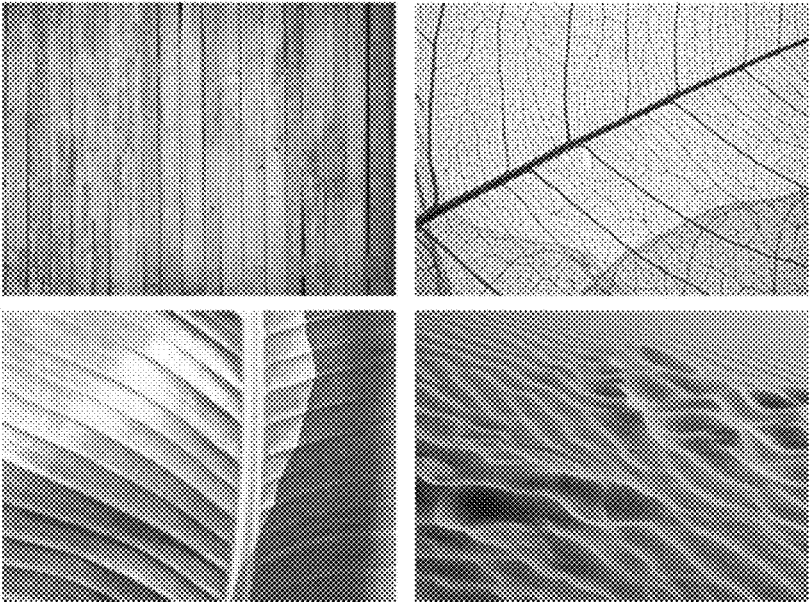
FIG. 2 exemplarily shows several display screens.

Referring to FIG. 1, several vibration modes in the
traditional haptic feedback technology are shown. These
vibration modes can only make the touch substrate generate
low-frequency vibrations in the vertical direction and cannot
achieve the texture haptic feedback of several display
screens shown in FIG. 2.

Figure 3:
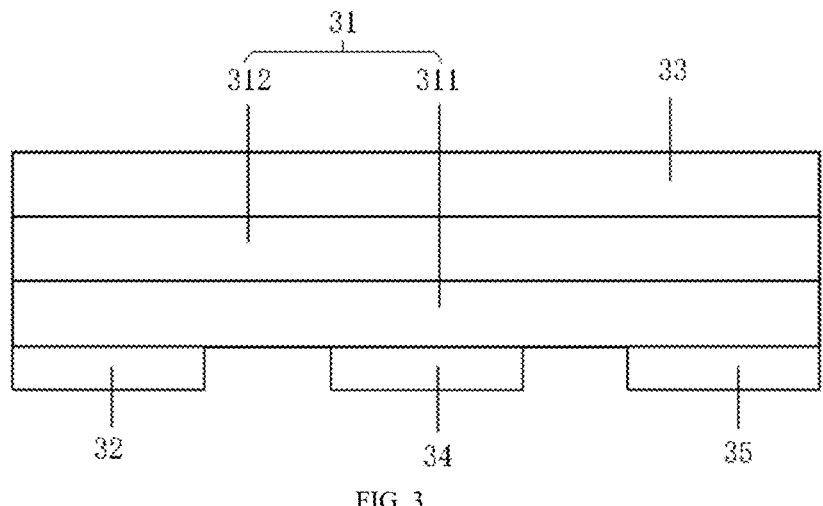
FIG. 3 exemplarily shows a schematic cross-sectional
view of a haptic feedback module.

Referring to FIG. 3, a schematic cross-sectional view of
a haptic feedback module involved in the present disclosure
is shown. The haptic feedback module includes a touch
display panel 31 and an actuator assembly 32 disposed on at
least one side of the touch display panel 31. The touch
display panel 31 includes a display panel 311 and a touch
circuit 312. When a touch object performs a touch operation
on the touch display panel 31, the touch circuit 312 is
configured to detect the touch position of the touch object on
the touch display panel 31. The touch circuit 312 may be
integrated into the display panel 311 or may be separated
from the display panel 311. As shown in FIG. 3, the touch
circuit 312 is arranged on the light-emitting surface of the display panel 311, and the actuator assembly 32 is arranged
on the side of the touch display panel 31 facing away from
the light-emitting surface.

For example, the actuator assembly 32 may include a
plurality of piezoelectric ceramic sheets stacked together,
and may operate by utilizing the inverse piezoelectric effect
of piezoelectric materials. The phenomenon that piezoelec-
tric materials are polarized under the action of pressure and
a potential difference occurs between two end surfaces is
called "direct piezoelectric effect". An inverse effect of the
direct piezoelectric effect, that is, the dielectric, when driven
by an electrical signal, will undergo elastic deformation, is
called "inverse piezoelectric effect". In the present disclo-
sure, the piezoelectric materials in the actuator assembly 32
can vibrate by loading a drive signal to the actuator assembly
32, and then the touch display panel 31 is driven to vibrate.

Figure 4A:
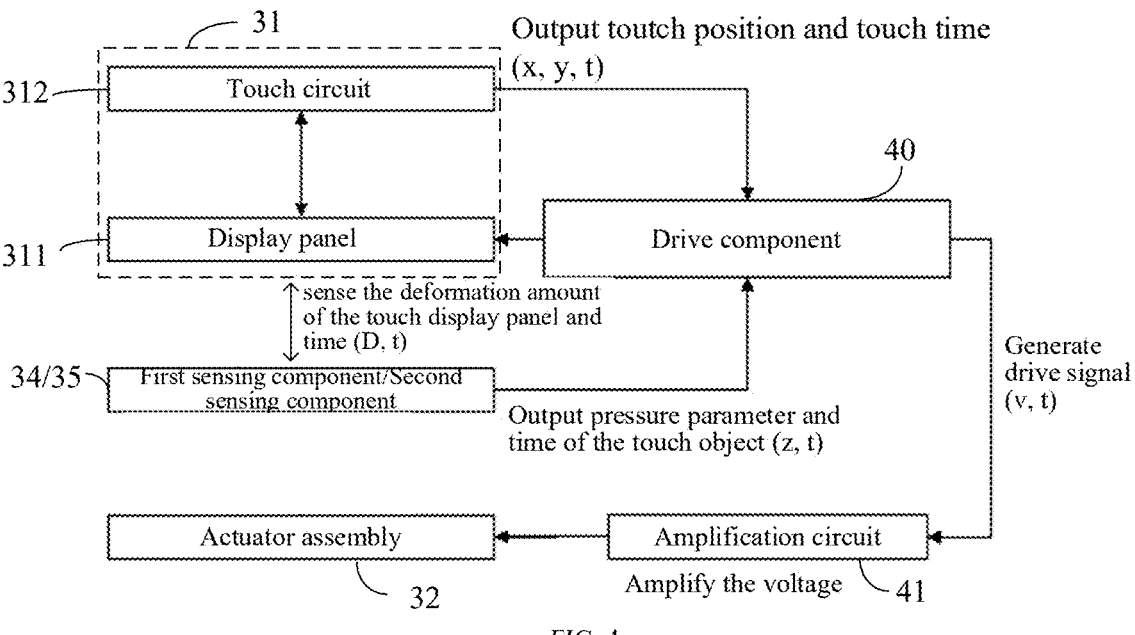
FIG. 4*a* exemplarily shows a connection schematic dia-
gram of a haptic feedback device.

Referring to FIG. 4*a*, a connection schematic diagram of
a haptic feedback device is shown. In the present disclosure.
As an example, the haptic feedback device includes the
haptic feedback module shown in FIG. 3. The execution
subject of the haptic feedback method provided by the
present disclosure may be a drive component 40 in the haptic
feedback device. The drive component 40 is respectively
connected to the touch display panel 311 and the actuator
assembly 32 in the haptic feedback module. For example,
when the haptic feedback device is applied in a terminal, the
drive component 40 may be a processor in the terminal.

Referring to FIG. 4*b*, a flowchart of a haptic feedback
method provided by the present disclosure is shown. The
haptic feedback method may include steps described below.

At step S01, touch information and display information
on the touch display panel 31 are acquired. The touch
information includes a touch position of the touch object on
the touch display panel 31, and the display information
includes the information of a display object displayed on the
touch display panel 31, and the touch position is located
within the display object.

The touch object may be an object such as a finger or a
stylus, which is not limited in the present disclosure.

During specific implementation, the touch information
includes the touch position of the touch object on the touch
display panel 31, and may also include information such as
a touch time for the touch position.

The display information may include information such as
the color and brightness of the display object at the touch
position, and may also include information such as the color
and brightness of other display objects.

At step S02, a drive signal is generated according to the
touch information, the display information, and surface
characteristic parameters of the display object. The drive
signal is output to the actuator assembly 32, so that the
actuator assembly 32 drives the touch display panel 31 to
vibrate and form haptic feedback on the surface of the touch
display panel 31.

In some implementations, the surface characteristic
parameters of the display object are parameters character-
izing surface characteristics of the display object, and
include at least one of a surface friction coefficient, surface
roughness, and surface flatness.

For example, the surface characteristic parameters of the
display object may be pre-stored in the execution subject, or
may be obtained according to the display data of the display
object through the machine learning, which is not limited in
the present disclosure.

In the haptic feedback method provided by the present
disclosure, since the drive signal for driving the actuator
assembly 32 to vibrate is generated based on the touch information, the display information, and the surface characteristic parameters of the display object at the touch position, the surface characteristics of the display object can be converted into force-haptic information. Accordingly, the tactile impression felt by the touch object is close to the surface characteristics of the display object seen visually, thereby realizing a texture haptic feedback and improving the user's haptic feedback experience.

During specific implementation, the coordinate system of the touch position can be set to completely coincide with the coordinate system of the display screen on the display panel. In this way, the display object corresponding to the touch position can be determined according to the touch position, and then the surface characteristic parameters of the display object can be obtained.

Referring to FIG. 5, the simulation results of the vibration of the touch display panel 31, when it is driven by the actuator assembly 32 with signals of different frequencies, are shown. As shown in the left figure in FIG. 5, when the actuator assembly 32 is driven with a low-frequency signal, the actuator assembly 32 drives the touch display panel 31 to generate a vibration sensation in the vertical direction similar to that formed by a traditional vibration motor. As shown in the right figure in FIG. 5, when the actuator assembly 32 is driven with a high-frequency signal, the touch display panel 31 is driven by the actuator assembly 32 to generate a standing wave vibration mode, and can generate a squeeze air film effect with the touch object. The half-wavelength of the standing wave vibration mode can be less than or equal to 20 millimeters, and the vibration frequency is located in the ultrasonic frequency band, such as greater than or equal to 20 KHz.

The squeeze air film effect refers to the situation where one of two flat plates is in high-frequency vibration, and the air pressure between the plates is higher than the external atmospheric pressure, so that a squeeze air film is formed between the plates. This squeeze air film can reduce the normal pressure between the two flat plates, thereby reducing the relative friction coefficient between the two flat plates, and reproducing surface texture information of a virtual object in the form of changing the friction force.

Figures 6, 7:
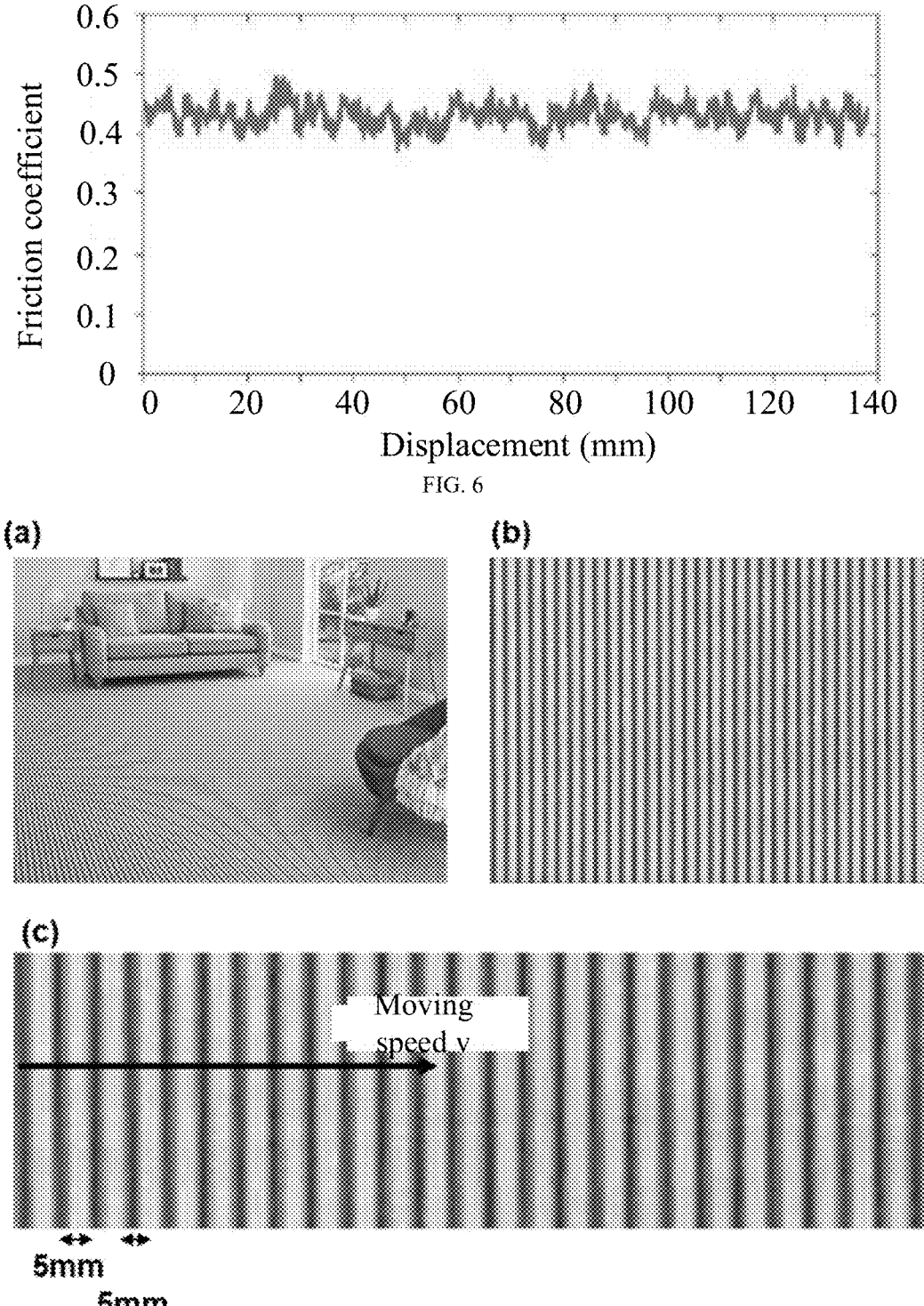
FIG. 6 exemplarily shows a curve of changes in a friction
coefficient between a touch object and the touch display
panel with respect to displacement.
FIG. 7 exemplarily shows a first display screen displayed
on the touch display panel.

In the present disclosure, the touch object is equivalent to one of the two flat plates, and the touch display panel 31 is equivalent to the other one of the two flat plates. By adjusting the drive signal, the horizontal friction force between the touch object and the touch display panel 31 can be changed. In this way, the change of the surface friction force can be realized, and the quantification of the texture haptic can be achieved, so that a real tactile impression of the display object can be simulated. Referring to FIG. 6, a curve of the change in the friction coefficient between a touch object and the touch display panel 31 with respect to displacement is shown. In FIG. 6, the frequency at which the horizontal friction force jumps is the spatial frequency.

Referring to FIG. 7, a display screen displayed on the touch display panel 311 is shown. In FIG. 7, figure a is a room screen; figure b shows a carpet part of the room screen; figure b is enlarged and subjected to black-and-white binarization processing to obtain figure c. As shown in figure c in FIG. 7, the carpet includes black and white stripes. Both the black stripes and the white stripes have a width of 5 mm and are alternately arranged in a first direction. In the present disclosure, unless otherwise specified, the black stripes refer to the stripes with a darker color, and the white stripes refer to the stripes with a lighter color.

The display screen shown in FIG. 7 is taken as an example to illustrate the haptic feedback method provided by the present disclosure. The black stripes and the white stripes are different display objects.

Figure 8:
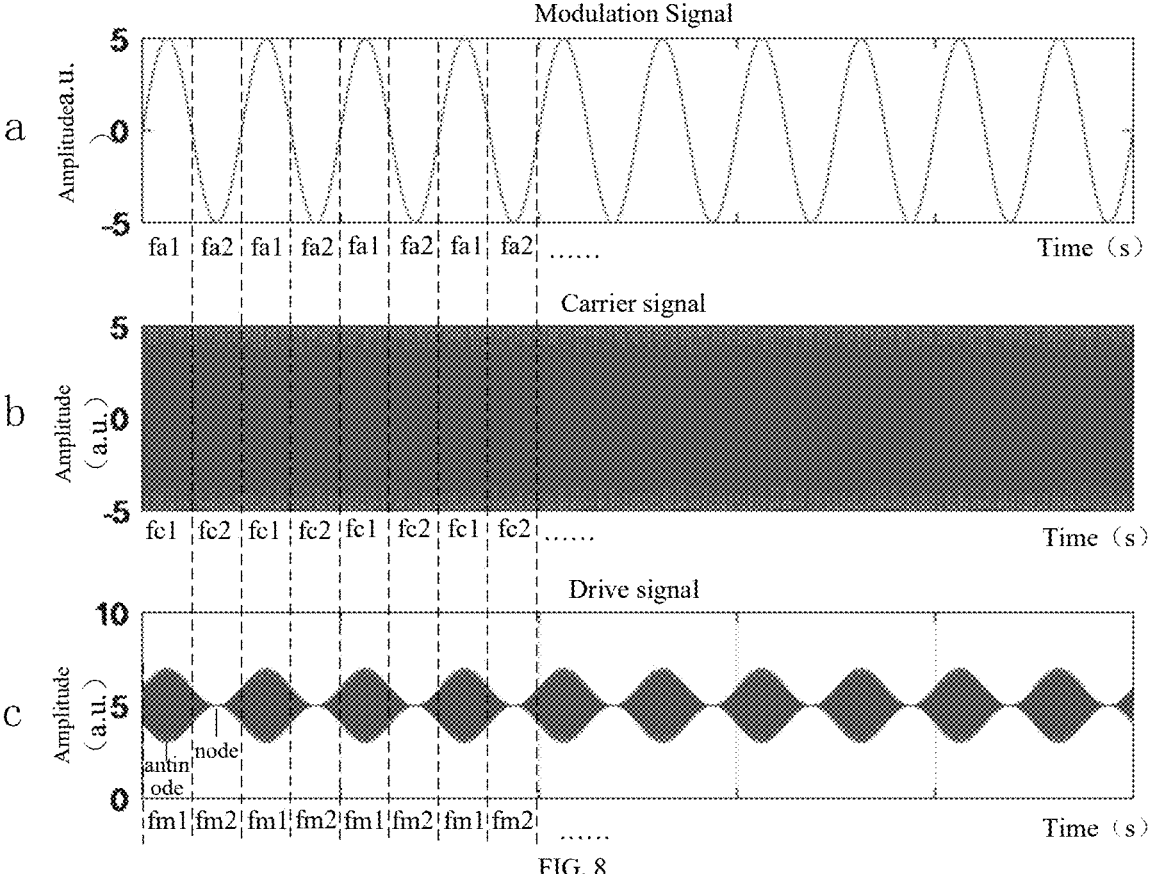
FIG. 8 exemplarily shows waveform diagrams of a modu-
lation signal, a carrier signal, and a drive signal.

In some implementations, as shown in figure c of FIG. 8, the drive signal includes first drive signals fm1 and second drive signals fm2 in different time periods. The amplitude of the first drive signal fm1 is greater than that of the second drive signal fm2. The surface characteristic parameters include the surface friction coefficient. The display objects include a first display object and a second display object. The surface friction coefficient of the first display object is less than that of the second display object. Step S02 may include steps below.

At step S11, if the touch position is located within the first display object, the first drive signal fm1 is generated according to the touch information, the display information, and the surface friction coefficient of the first display object.

At step S12, if the touch position is located within the second display object, the second drive signal fm2 is generated according to the touch information, the display information, and the surface friction coefficient of the second display object.

For example, as shown in FIG. 7, the first display object is the black stripe, and the second display object is the white stripe. When the touch position is located within the first display object (black stripe), the first drive signal fm1 with a larger amplitude is generated, so that the touch object can feel a smaller friction force in the black stripe area; when the touch position is located within the second display object (white stripe), the second drive signal fm2 with a smaller amplitude is generated, so that the touch object can feel a larger friction force in the white stripe area, thereby realizing the tactile impression corresponding to the display texture.

As shown in FIG. 7, when the touch object moves across a plurality of alternately arranged black and white stripes on the touch display panel 31, the first drive signal fm1 and the second drive signal fm2 can be alternately generated, thereby realizing a periodic tactile impression corresponding to the display texture.

In this implementation, the frequencies of the first drive signal fm1 and the second drive signal fm2 may be either the same (as shown in FIG. 8) or different, which is not limited in the present disclosure.

In some implementations, as shown in FIG. 7, the first display object and the second display object are periodically and alternately arranged in the first direction. The first direction is a moving direction of the touch position (the direction indicated by an arrow in FIG. 7). As shown in FIG. 8, the first drive signal fm1 includes a first modulation signal fa1 and a first carrier signal fc1 that are superimposed on each other, and the second drive signal fm2 includes a second modulation signal fa2 and a second carrier signal fc2 that are superimposed on each other. The first modulation signal fa1 and the second modulation signal fa2 are two signals located in different time periods of the same modulation signal.

The frequency of the first modulation signal fa1 is used for representing a first spatial frequency of the first display object in the first direction. The first spatial frequency indicates the number of times the first display object occurs within a unit distance. Similarly, the frequency of the second modulation signal fa2 is used for representing a second spatial frequency of the second display object in the first direction. The second spatial frequency indicates the number of times the second display object occurs within a unit distance. Since the first display object and the second display object are periodically and alternately arranged in the first direction, it can be considered that the first spatial frequency and the second spatial frequency are the same. Therefore, the first drive signal fm1 and the second drive signal fm2 can be synthesized by using the modulation signals with the same frequency, that is, the first modulation signal fa1 and the second modulation signal fa2 can be two signals located in different time periods of the same modulation signal (that is, the modulation signal shown in figure a of FIG. 8).

The modulation signal shown in figure a of FIG. 8 includes the first modulation signal fa1 and the second modulation signal fa2 located in different time periods.

It should be noted that the first carrier signal fc1 and the second carrier signal fc2 may have the same or different frequencies, and may have the same or different amplitudes, which is not limited in the present disclosure.

In some implementations, as shown in figure c of FIG. 8, the envelope of the drive signal includes antinodes and nodes. The first drive signal fm1 includes the antinode, and the second drive signal fm2 includes the node. In this way, the amplitude of the first drive signal fm1 is greater than that of the second drive signal fm2.

For example, as shown in figure c of FIG. 8, the antinode is located at the center position of the first drive signal fm1, and the first drive signal fm1 is a symmetrical signal centered on the antinode; the node is located at the center of the second drive signal fm2, and the second drive signal fm2 is a symmetrical signal centered on the node.

Figure 9:
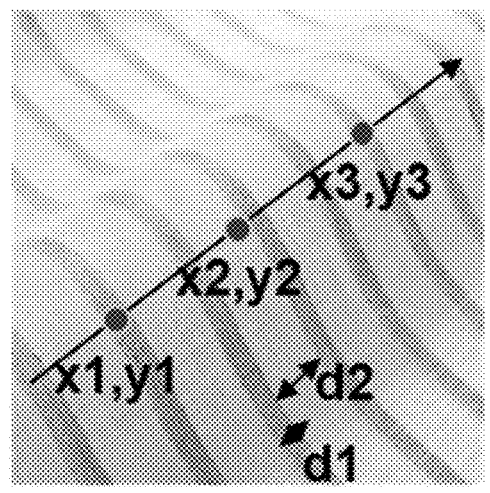
FIG. 9 exemplarily shows a second display screen dis-
played on the touch display panel.
Figure 10:
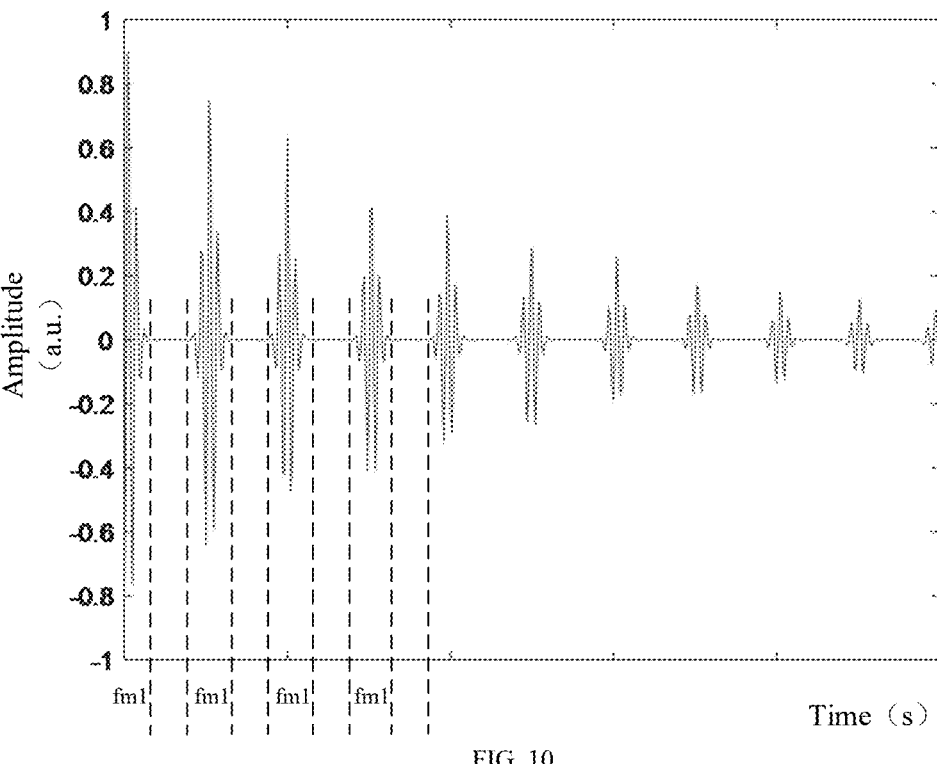
FIG. 10 exemplarily shows a waveform diagram of
another drive signal.

In some implementations, the surface characteristic parameters include the surface friction coefficient. As shown in FIG. 7 or FIG. 9, the display objects include the first display object (black stripe) and the second display object (white stripe) that are alternately arranged in the first direction. The surface friction coefficient of the first display object is less than that of the second display object. The first direction is the moving direction of the touch position. As shown in FIG. 10, the drive signal is a pulse signal, and step S02 may include step S21.

At step S21, if the touch position is located within the first display object, an effective signal of the pulse signal, that is, the first drive signal fm1, is generated according to the touch information, the display information, and the surface friction coefficient of the first display object.

In this implementation, when the touch position is located within the first display object (black stripes), the effective signal of the pulse signal is generated, and when the touch position is located within the second display object (white stripes), no effective signal is generated. In this way, the touch object can feel a smaller friction force in the black stripe area and a larger friction force in the white stripe area, thereby realizing the tactile impression corresponding to the display texture.

As shown in FIG. 7 or FIG. 9, when the touch object moves across a plurality of alternately arranged black and white stripes on the touch display panel 31, the effective signal of the pulse signal can be generated according to a certain duty cycle, thereby realizing the periodic tactile impression corresponding to the display texture.

In some implementations, the duty cycle of the pulse signal is positively correlated with a ratio of the widths of the first display object and the second display object in the first direction.

For example, as shown in FIG. 7 or FIG. 9, the width of the first display object in the first direction is d1, and the width of the second display object in the first direction is d2. The duty cycle of the pulse signal, that is, the ratio of the time during which the effective signal is output to the total time within one pulse period, can be, for example, d1/(d1+ d2). That is to say, the duty cycle of the pulse signal is positively correlated with the ratio d1/d2 of the widths of the first display object and the second display object in the first direction.

The width d1 of the first display object in the first direction and the width d2 of the second display object in the first direction may be the same or different, which is not limited in the present disclosure.

In order to avoid generating a drive signal due to accidental touches on the touch display panel 31 by external objects, in some implementations, the touch information also includes a pressure parameter of the touch object on the touch display panel 31. The pressure parameter includes a touch pressure and/or parameters characterizing the magnitude of the touch pressure. Step S02 may include step S31.

At step S31, if the pressure parameter is greater than or equal to a preset threshold, a drive signal is generated according to the touch information, the display information, and the surface characteristic parameters of the display object. Here, the preset threshold is a critical value of the pressure parameter for distinguishing between accidental touch operations and non-accidental touch operations.

The pressure parameter may be the touch pressure, or it may also be parameters characterizing the magnitude of the touch pressure, such as the deformation amount generated by the touch display panel 31 under the touch of the touch object. The preset threshold may be preset according to actual requirements, which is not limited in the present disclosure.

In some implementations, after step S02, the following steps may also be included: obtaining the deformation amount of the touch display panel 31 when it vibrates driven by the actuator assembly 32; then adjusting the drive signal according to the deformation amount.

For example, an actual measured vibration waveform can be generated according to the deformation amounts at various positions of the touch display panel 31, and this actual measured vibration waveform can be compared with an expected vibration waveform, and then the frequency and/or amplitude of the drive signal can be adjusted according to the comparison result. Among them, the expected vibration waveform may be a pre-stored vibration waveform or a vibration waveform obtained through theoretical calculation based on the drive signal, which is not limited in the present disclosure. A closed-loop control of detection-output-detection-output can be achieved through this implementation.

In some implementations, as shown in FIG. 9, the display objects include a plurality of first display objects arranged along the first direction and having the same surface friction coefficient. The first direction is the moving direction of the touch position (the direction indicated by the arrow in the figure). As shown in FIG. 10, the drive signal includes a plurality of first drive signals fm1 in different first time periods. The first time period is a period during which the touch position is located within the same first display object. Step S02 may include steps described below.

At step S41, if the first direction is a direction from the foreground to the background (as shown in FIG. 9), a plurality of first drive signals fm1 with gradually decreasing amplitudes are generated according to the touch information, the display information, and the surface characteristic parameters of the display object (as shown in FIG. 10).

At step S42, if the first direction is a direction from the background to the foreground (the opposite direction indicated by the arrow in FIG. 9), a plurality of first drive signals fm1 with gradually increasing amplitudes are generated according to the touch information, the display information, and the surface characteristic parameters of the display object.

In FIG. 10, the drive signal is a pulse signal, and the effective signal of the pulse signal is the first drive signal fm1. In this implementation, the first display object may be a continuous area with the same or similar friction coefficients, such as black stripes or white stripes on the display screen.

In some implementations, the drive signal includes a modulation signal and a carrier signal that are superimposed on each other, and step S02 may include steps described below.

At step S51, a modulation signal is generated according to the touch information and the display information, as shown figure a of FIG. 8.

At step S52, a carrier signal is generated according to the surface characteristic parameters of the display object, as shown figure b of FIG. 8. The carrier signal is used to form a squeeze air film effect between the touch object and the touch display panel 31.

In order to form a squeeze air film effect between the touch object and the touch display panel 31, in some implementations, the frequency of the carrier signal may be greater than or equal to 20 kHz.

During specific implementation, first, a modal equation of the touch display panel 31 may be determined first. The modal equation is used for reflecting the vibration characteristics of the touch display panel 31. Specifically, modal analysis may be performed on the touch display panel 31 (a mode refers to the inherent vibration characteristics of a mechanical structure, and modal analysis is a method for studying these characteristics) to obtain the modal equation of the touch display panel 31.

For example, the modal equation of the touch display panel 31 may include:

$$\underline{\omega}(x, t) = \underline{W}e^{j\omega t} = \sum_{n=1}^{\infty} W_n \phi_n(x) e^{j\omega t};$$

among them, $\omega(x, t)$ represents the amplitude of the touch display panel 31 on point x at time t, j is an imaginary unit, n is a positive integer, x is an angular frequency, $We^{jwt}$ is the modal equation, including a real part and an imaginary part, $W_n$ is a modal participation factor, and $\varphi_n(x)$ is a planned modal vibration mode factor.

At step S53, the drive signal is obtained by synthesizing the modulation signal and the carrier signal, as shown in figure c of FIG. 8.

In this step, the drive signal may be calculated according to the following formula: Drive signal fm=modulation signal fa+carrier signal fc.

Figure 11:
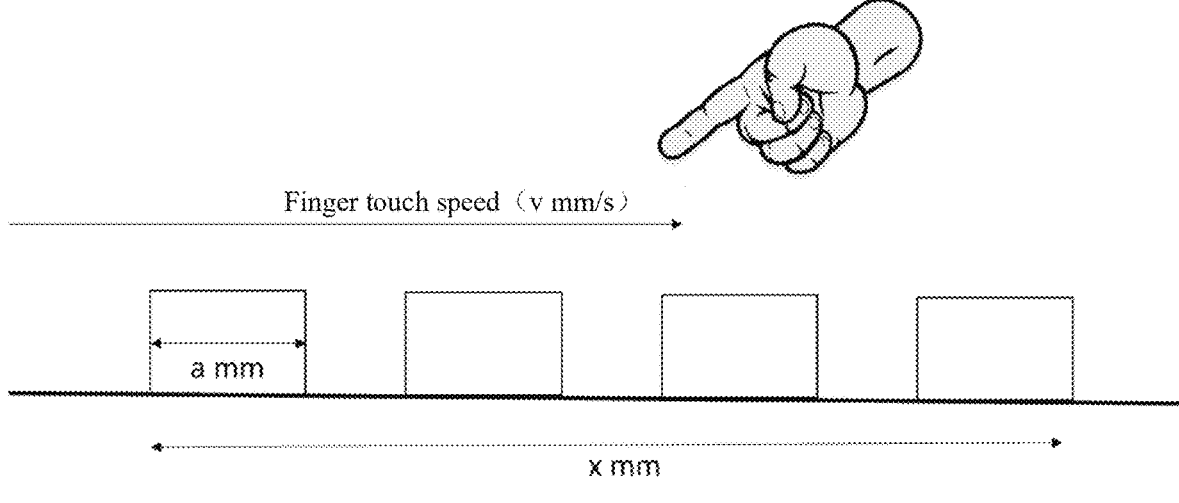
FIG. 11 exemplarily shows a schematic diagram in which
a user's finger moves on the surface of an object.

FIG. 11 shows a schematic diagram in which a user's finger moves on the surface of an object. The surface of the object has bulges arranged at equal intervals. When the user's finger touches the surface of the object, the tactile impression of the finger is greatly affected by vision. For example, when a striped pattern is seen visually, people psychologically expect to be able to feel the tactile impression at a fixed interval. When the finger touches at different speeds, the stimulation frequencies felt at the fingertip are different. Therefore, the frequency of the modulation signal can be determined according to the moving speed of the touch object, and then the modulation signal can be generated.

In some implementations, the touch information includes the touch positions of the touch object at a plurality of moments, and step S51 may include steps described below.

At step S61, the moving speed of the touch object in the first direction is calculated according to the touch positions of the touch object at at least two moments.

For example, step S61 may specifically include: Firstly, obtaining the moving distance of the touch object between two adjacent moments according to the touch positions of the touch object at the two adjacent moments; then calculating the ratio of the moving distance to the time interval between the two adjacent moments to obtain the first speed; and then calculating an average value of a plurality of first speeds to obtain the moving speed.

For example, the touch display panel 31 collects the touch positions of the touch object and the corresponding time information at a frequency of 120 Hz (i.e., fs). As shown in FIG. 9, when the touch object slides along the first direction on the touch display panel 31, the touch positions collected at three moments t1, t2, and t3 are (x1, y1), (x2, y2), and (x3, y3) respectively. Firstly, the moving distance s1 from time t1 to time t2 and the moving distance s2 from time t2 to time t3 can be calculated:

$$s1 = \left((x2 - x1)^2 + (y2 - y1)^2\right)^{0.5}, s2 = \left((x3 - x2)^2 + (y3 - y2)^2\right)^{0.5}.$$

Next, the time interval between two adjacent moments is calculated, that is, the time interval between time t1 and time t2 and the time interval between time t2 and time t3, both of which are $(fs)^{-1}$.

Then, two first speeds are calculated: $v1=s1/(fs)^{-1}$ and $v1=s2/(fs)^{-1}$.

Then, the average value of these two first speeds is calculated to obtain the moving speed v, that is:

$$v = \left(s1/(fs)^{-1} + s2/(fs)^{-1}\right)/2 = \left(\left(\left((x2 - x1)^2 + (y2 - y1)^2\right)^{0.5}/(fs)^{-1}\right) + \right.$$
$$\left.\left(\left((x3 - x2)^2 + (y3 - y2)^2\right)^{0.5}/(fs)^{-1}\right)\right)/2$$

At step S62, the modulation frequency of the modulation signal is obtained according to the width of the display object in the first direction and the moving speed.

For example, step S62 can specifically include: Firstly, calculating the ratio of the width of the display object in the first direction to the moving speed to obtain the first time period; then determining a reciprocal of the first time period as the modulation frequency.

For example, the width of the display object in the first direction is d, the moving speed of the touch object in the first direction is v, the first time period T=d/v, and the first time period represents the time required for the touch object to pass through the display object; then the reciprocal of the first time period is determined as the modulation frequency fa=1/T.

When d=5 mm and v=100 mm/s, the first time period T=0.05 s, and the modulation frequency fa-20 Hz; when d=5 mm and v=50 mm/s, the first time period T=0.1 s, and the modulation frequency f=10 Hz.

Ay step S63, the modulation signal is generated according to the modulation frequency.

For example, as shown in FIG. 4*a*, the haptic feedback method provided by the present disclosure may include the following steps.

At step 1, the display object is controlled by the drive component 40 to be displayed on the touch display panel 31.

At step 2, the touch information on the touch display panel 31 is obtained by the drive component 40, and the touch information includes the touch position (x, y) and the touch time t corresponding to the touch position.

At step 3, the moving speed of the touch object in the first direction is calculated by the drive component 40 according to the touch positions (x, y) at a plurality of moments t.

At step 4, the pressure parameter Z of the touch object on the touch display panel 31 is obtained by the drive component 40.

At step 5, when Z is greater than or equal to the preset threshold, the drive component 40 generates a drive signal (v, t) according to the size of the display object at the touch position in the first direction, the moving speed of the touch object in the first direction, and the surface characteristic parameters of the display object at the touch position.

At step 6, the drive signal (v, t) is amplified by the amplification circuit, and the drive signal with the amplified amplitude is output to the actuator assembly 32.

At step 7, under the action of the amplified drive signal, the actuator assembly 32 drives the touch display panel 31 to resonate, and the vibration mode is a standing wave, thereby forming haptic feedback on the surface of the touch display panel.

The present disclosure also provides a haptic feedback device. Referring to FIG. 3 and FIG. 4a, the haptic feedback device includes: a touch display panel 31; an actuator assembly 32 disposed on at least one side of the touch display panel 31; and a drive component 40 that is respectively connected to the touch display panel 31 and the actuator assembly 32, and configured to: acquire the touch information and the display information on the touch display panel 31, the touch information includes the touch position of the touch object on the touch display panel 31, and the display information includes the information of the display object displayed on the touch display panel 31, the touch position is located within the display object; and generate a drive signal according to the touch information, the display information, and the surface characteristic parameters of the display object. The drive signal is output to the actuator assembly 32, so that the actuator assembly 32 drives the touch display panel 31 to vibrate and form haptic feedback on the surface of the touch display panel 31.

Those skilled in the art can understand that the haptic feedback device provided by the present disclosure has the advantages of the above haptic feedback method. The haptic feedback device provided by the present disclosure may be integrated into products such as notebooks and monitors, and may be used as display screens in numerous fields such as in-vehicle displays and consumer electronics to provide users with rich and realistic haptic experiences.

Regarding the haptic feedback device, the specific way in which the drive component 40 performs operations has already been described in detail in the implementations of the haptic feedback method, and will not be elaborated here.

It should be noted that the touch display panel 31 may include a display panel 311 and a touch circuit 312. The touch circuit 312 may be integrated into the display panel 311 or may be separated from the display panel 311, for example, attached to the light-emitting side of the display panel 311. The present disclosure does not limit this.

In some implementations, the display panel 311 may be a liquid crystal display panel 311 or a self-luminous display panel 311, which is not limited in the present disclosure. The self-luminous display panel 311 has built-in light-emitting devices. The light-emitting devices may be, for example, Organic Light-Emitting Diode (OLED), Quantum Dot Light-Emitting Diode (QLED), Mini Light-Emitting Diode (Mini LED), or Micro Light-Emitting Diode (Micro LED), and so on.

In some implementations, the touch circuit 312 may be a capacitive touch circuit 312 or a resistive touch circuit 312, which is not limited in the present disclosure.

For the capacitive touch circuit 312, when a touch object such as a user's finger touches the touch display panel 31, the touch capacitance between the touch drive electrode and the touch sensing electrode in the touch circuit 312 at the touch position will change. The touch traces in the touch circuit 312 may send the touch capacitance at each position to the drive component 40, and the drive component 40 may determine the touch position according to the touch capacitances at various positions.

In some implementations, the drive component 40 may include a controller and a driver. For example, when the touch object applies a touch operation on the touch display panel 31, the touch display panel 31 receives the touch operation. The controller responds to the touch operation and outputs a drive signal in the form of a digital signal to the driver. After the driver performs digital-to-analog conversion on the drive signal in the form of a digital signal, it generates a drive signal in the form of an analog signal and sends it to the actuator assembly 32. The actuator assembly 32 vibrates under the drive of the drive signal, thereby driving the touch display panel 31 to vibrate and then forming haptic feedback.

For example, the controller may include at least one of: a Microcontroller Unit (MCU), and an FPGA (Field Programmable Gata Array), and so on, which is not limited in the embodiment.

In some implementations, as shown in FIG. 4, the haptic feedback device may also include: an amplification circuit 41 that is respectively connected to the drive component 40 and the actuator assembly 32, and is configured to amplify the drive signal output by the drive component 40 and send the amplified signal to the actuator assembly 32.

In some implementations, as shown in FIG. 3, the haptic feedback device may also include: a first sensing component 34 that is arranged on one side of the touch display panel 311, and is configured to sense the pressure parameter of the touch object on the touch display panel 31 and send the pressure parameter to the drive component 40. The pressure parameter includes the touch pressure and/or parameters characterizing the magnitude of the touch pressure.

For example, the first sensing component 34 may include a plurality of piezoelectric ceramic sheets stacked together, which is a device that operates by utilizing the direct piezoelectric effect of piezoelectric materials, and is configured to detect the displacement deformation generated due to the touch of the touch object on the touch display panel 311 and generate an electrical signal.

During specific implementation, the first sensing component 34 may also be other sensors that can convert strain into electrical signals, such as strain gauges, and so on.

In some implementations, as shown in FIG. 3, the haptic feedback device may also include: a second sensing component 35 that is arranged on one side of the touch display panel 311, and is configured to sense the deformation amount of the touch display panel 31 due to the vibration driven by the actuator assembly 32 and send the deformation amount to the drive component 40.

For example, the second sensing component 35 may include a plurality of piezoelectric ceramic sheets stacked together, which is a device that operates by utilizing the direct piezoelectric effect of piezoelectric materials, and is configured to detect the displacement deformation of the touch display panel 311 due to the vibration driven by the actuator assembly 32 and generate an electrical signal.

During specific implementation, the second sensing component 35 may also be other sensors that can convert strain into electrical signals, such as strain gauges, and so on.

For example, as shown in FIG. 3, the haptic feedback device may also include a cover plate 33 that is arranged on the touch display panel 31 for protecting the touch display panel 31 and the actuator assembly 32, such as tempered glass.

In some implementations, the vibration mode adopted by the actuator assembly 32 for driving the touch display panel 31 to vibrate is a standing wave vibration mode, and the half-wavelength of the standing wave vibration mode is less than or equal to 20 mm.

During specific implementation, the half-wavelength of the standing wave can be adjusted by adjusting the frequency of the carrier signal. Further, the half-wavelength of the standing wave vibration mode may be less than or equal to 15 mm.

In the present disclosure, "a plurality of" means two or more, and "at least one" means one or more, unless otherwise clearly and specifically defined.

In the present disclosure, the orientation or positional relationship indicated by terms such as "upper", "lower", etc. is based on the orientation or positional relationship shown in the accompanying drawings, which is only for the convenience of describing the present disclosure and simplifying the description, and does not indicate or imply that the referred device or element must have a specific orientation, be constructed and operated in a specific orientation. Therefore, it should not be construed as a limitation to the present disclosure.

Herein, the terms "comprise", "include" or any other variants thereof are intended to cover non-exclusive inclusion, so that a process, method, commodity or device including a series of elements not only includes those elements, but also includes other elements that are not explicitly listed, or also includes elements inherent to such a process, method, product or device. Without further limitations, an element defined by the phrase "including one . . . " does not exclude the existence of additional identical elements in the process, method, commodity or device that includes the element.

Herein, terms such as "one embodiment", "some embodiments", "exemplary embodiment", "one or more embodiments", "example", "one example", "some examples", etc. are intended to indicate that specific features, structures, materials or characteristics related to the embodiment or example are included in at least one embodiment or example of the present disclosure. The schematic representation of the above terms does not necessarily refer to the same embodiment or example. Moreover, the specific features, structures, materials or characteristics can be included in any one or more embodiments or examples in any appropriate manner.

Herein, relational terms such as first and second are only used to distinguish one entity or operation from another entity or operation, and do not necessarily require or imply that there is any actual relationship or order between these entities or operations.

When describing some embodiments, the expressions "coupled" and "connected" may be used. For example, when describing some embodiments, the term "connected" may be used to indicate that two or more components have direct physical contact or electrical contact with each other. For another example, when describing some embodiments, the term "coupled" may be used to indicate that two or more components have direct physical contact or electrical contact with each other. However, the term "coupled" or "communicatively coupled" may also mean that two or more components do not have direct contact with each other, but still cooperate or interact with each other. The embodiments disclosed here are not necessarily limited to the content of this text.

"At least one of A, B and C" has the same meaning as "at least one of A, B or C", and both include the following combinations of A, B and C: only A; only B; only C; a combination of A and B; a combination of A and C; a combination of B and C; and a combination of A, B and C.

"A and/or B" includes the following three combinations: only A; only B; and a combination of A and B.

As used herein, depending on the context, the term "if" is optionally interpreted to mean "when . . . " or "upon . . . " or "in response to determining" or "in response to detecting". Similarly, depending on the context, the phrases "if it is determined . . . " or "if [the stated condition or event] is detected" are optionally interpreted to mean "when it is determined . . . " or "in response to determining . . . " or "when [the stated condition or event] is detected" or "in response to detecting [the stated condition or event]".

The use of "for" or "configured to" herein implies open and inclusive language and does not exclude devices that are applicable or configured to perform additional tasks or steps.

The use of "based on" or "according to" herein implies openness and inclusiveness. A process, step, calculation or other action based on one or more of the stated conditions or values may, in practice, be based on other conditions or values may, in practice, be based on other conditions or exceed the stated values. A process, step, calculation or other action according to one or more of the stated conditions or values may, in practice, be according to other conditions or values may, in practice, be according to other conditions or exceed the stated values.

As used herein, "about", "approximately" or "nearly" includes the stated value as well as the average value within the acceptable deviation range of the specific value, where the acceptable deviation range is determined by those of ordinary skill in the art considering the measurement in question and the errors related to the measurement of a specific quantity (i.e., the limitations of the measurement system).

As used herein, "parallel", "perpendicular", "equal", "flush" include the stated situations as well as situations similar to the stated ones, and the range of the similar situations is within the acceptable deviation range, where the acceptable deviation range is determined by those of ordinary skill in the art considering the measurement in question and the errors related to the measurement of a specific quantity (i.e., the limitations of the measurement system). For example, "parallel" includes absolute parallelism and approximate parallelism, where the acceptable deviation range for approximate parallelism can be, for example, a deviation within 5°; "perpendicular" includes absolute perpendicularity and approximate perpendicularity, where the acceptable deviation range for approximate perpendicularity can also be, for example, a deviation within 5°. "Equal" includes absolute equality and approximate equality, where the acceptable deviation range for approximate equality can be, for example, that the difference between the two equal ones is less than or equal to 5% of either of them. "Flush" includes absolute flushness and approximate flushness, where the acceptable deviation range for approximate flushness can be, for example, that the distance between the two flush ones is less than or equal to 5% of the size of either of them.

It should be understood that when a layer or element is referred to as being on another layer or substrate, it may be that the layer or element is directly on the other layer or substrate, or there may be an intermediate layer between the layer or element and the other layer or substrate.

Exemplary embodiments are described herein with reference to cross-sectional views and/or plan views as idealized exemplary drawings. In the drawings, the thicknesses of layers and regions are enlarged for clarity. Therefore, variations in the shape with respect to the drawings due to, for example, manufacturing techniques and/or tolerances can be envisaged. Therefore, the exemplary embodiments should not be construed as being limited to the shape of the regions shown herein, but include shape deviations caused by, for example, manufacturing. For example, an etched region shown as rectangular will usually have curved features. Therefore, the regions shown in the drawings are essentially schematic, and their shapes are not intended to show the actual shape of the regions of the device and are not intended to limit the scope of the exemplary embodiments.

Finally, it should be noted that the above embodiments are only used to illustrate the technical solutions of the present disclosure, rather than limiting the technical solutions; although the present disclosure has been described in detail with reference to the foregoing embodiments, those skilled in the art should understand that the technical solutions recorded in the foregoing embodiments may be modified, or equivalent replacement may be made for some of the technical features; and these modifications or replacements do not make the essence of the corresponding technical solutions deviate from the spirit and scope of the technical solutions of the various embodiments of the present disclosure.

The invention claimed is:

1. A haptic feedback method, applied to a haptic feedback device comprising a touch display panel and an actuator assembly, the haptic feedback method comprising:

acquiring touch information and display information on the touch display panel, wherein the touch information comprises a touch position of a touch object on the touch display panel, and the display information comprises information about a display object displayed on the touch display panel, the touch position being located within the display object; and generating a drive signal according to the touch information, the display information, and surface characteristic parameters of the display object, wherein the drive signal is output to the actuator assembly so that the actuator assembly drives the touch display panel to vibrate and form haptic feedback on a surface of the touch display panel, wherein the drive signal comprises a modulation signal and a carrier signal that are superimposed on each other, and the generating of the drive signal according to the touch information, the display information, and surface characteristic parameters of the display object comprises:

generating the modulation signal according to the touch information and the display information;

generating the carrier signal according to the surface characteristic parameters of the display object, wherein the carrier signal is used for forming a squeeze air film effect between the touch object and the touch display panel; and obtaining the drive signal by synthesizing the modulation signal and the carrier signal, and wherein the touch information comprises touch positions of the touch object at a plurality of moments, and the generating of the modulation signal according to the touch information and the display information comprises:

calculating a moving speed of the touch object in a first direction according to the touch positions of the touch object at at least two moments;

obtaining a first duration by calculating a ratio of a width of the display object in the first direction to the moving speed;

determining a reciprocal of the first duration as the modulation frequency; and generating the modulation signal according to the modulation frequency.

2. The haptic feedback method according to claim 1, wherein the drive signal comprises a first drive signal and a second drive signal in different time periods, and an amplitude of the first drive signal is greater than the amplitude of the second drive signal; the surface characteristic parameters comprise a surface friction coefficient, the display object comprises a first display object and a second display object, the surface friction coefficient of the first display object is less than the surface friction coefficient of the second display object; the generating a drive signal according to the touch information, the display information, and surface characteristic parameters of the display object comprises:

in response to the touch position being located within the first display object, generating the first drive signal according to the touch information, the display information, and the surface friction coefficient of the first display object;

in response to the touch position being located within the second display object, generating the second drive signal according to the touch information, the display information, and the surface friction coefficient of the second display object.

3. The haptic feedback method according to claim 2, wherein the first display object and the second display object are periodically and alternately arranged in the first direction, and the first direction is a moving direction of the touch position;

wherein the first drive signal comprises a first modulation signal and a first carrier signal that are superimposed on each other, and the second drive signal comprises a second modulation signal and a second carrier signal that are superimposed on each other, the first modulation signal and the second modulation signal are two signals in different time periods of a same modulation signal.

4. The haptic feedback method according to claim 3, wherein an envelope of the drive signal comprises an antinode and a node, the first drive signal comprises the antinode, and the second drive signal comprises the node.

5. The haptic feedback method according to claim 1, wherein the drive signal is a pulse signal; the surface characteristic parameters comprise a surface friction coefficient; the display object comprises a first display object and a second display object that are alternately arranged in the first direction; the surface friction coefficient of the first display object is less than the surface friction coefficient of the second display object; the first direction is a moving direction of the touch position; the generating a drive signal according to the touch information, the display information, and surface characteristic parameters of the display object comprises:

in response to the touch position being located within the first display object, generating an effective signal of the pulse signal according to the touch information, the display information, and the surface friction coefficient of the first display object.

6. The haptic feedback method according to claim 5, wherein a duty cycle of the pulse signal is positively correlated with a ratio of widths of the first display object and the second display object in the first direction.

7. The haptic feedback method according to claim 1, wherein the touch information further comprises a pressure parameter of the touch object on the touch display panel, the pressure parameter comprises a touch pressure and/or parameters characterizing a magnitude of the touch pressure, the generating a drive signal according to the touch information, the display information, and surface characteristic parameters of the display object comprises:

in response to the pressure parameter being greater than or equal to a preset threshold, generating the drive signal according to the touch information, the display information, and the surface characteristic parameters of the display object, wherein the preset threshold is a critical value of the pressure parameter for distinguishing between accidental touch operations and non-accidental touch operations.

8. The haptic feedback method according to claim 1, wherein after generating the drive signal, the method further comprises:

acquiring a deformation amount of the touch display panel due to a vibration driven by the actuator assembly; and adjusting the drive signal according to the deformation amount.

9. The haptic feedback method according to claim 1, wherein the display object comprises a plurality of first display objects arranged along the first direction and having the same surface friction coefficient, the first direction is a moving direction of the touch position, the drive signal comprises a plurality of first drive signals in different first time periods, the first time period is a period during which the touch position is located within the same one of the first display objects, the generating a drive signal according to the touch information, the display information, and surface characteristic parameters of the display object comprises:

in response to the first direction being a direction from a foreground to a background, generating a plurality of first drive signals with gradually decreasing amplitudes according to the touch information, the display information, and the surface characteristic parameters of the display object;

in response to the first direction being a direction from the background to the foreground, generating a plurality of first drive signals with gradually increasing amplitudes according to the touch information, the display information, and the surface characteristic parameters of the display object.

10. The haptic feedback method according to claim 1, wherein the surface characteristic parameters of the display object comprise at least one of: a surface friction coefficient, surface roughness, and surface flatness.

11. The haptic feedback method according to claim 1, wherein the calculating a moving speed of the touch object in a first direction according to the touch positions of the touch object at at least two moments comprises:

obtaining a moving distance of the touch object between two adjacent moments according to the touch positions of the touch object at the two adjacent moments;

obtaining a first speed by calculating a ratio of the moving distance to a time interval between the two adjacent moments; and obtaining the moving speed by calculating an average value of a plurality of the first speeds.

12. The haptic feedback method according to claim 1, wherein a frequency of the carrier signal is greater than or equal to 20 KHz.

13. A haptic feedback device, comprising:

a touch display panel;

an actuator assembly arranged on at least one side of the touch display panel; and a drive component, wherein the drive component is connected to the touch display panel and the actuator assembly respectively, and is configured to: acquire touch information and display information on the touch display panel, the touch information comprising a touch position of a touch object on the touch display panel, the display information comprising information of a display object displayed on the touch display panel, the touch position being located within the display object; and generate a drive signal according to the touch information, the display information, and surface characteristic parameters of the display object, wherein the drive signal is output to the actuator assembly, so that the touch display panel is driven by the actuator assembly to vibrate and form haptic feedback on a surface of the touch display panel, wherein the drive signal comprises a modulation signal and a carrier signal that are superimposed on each other, the drive component is further configured to:

generate the modulation signal according to the touch information and the display information;

generate the carrier signal according to the surface characteristic parameters of the display object, wherein the carrier signal is used for forming a squeeze air film effect between the touch object and the touch display panel; and obtain the drive signal by synthesizing the modulation signal and the carrier signal, and wherein the touch information comprises touch positions of the touch object at a plurality of moments, the drive component is further configured to:

calculate a moving speed of the touch object in a first direction according to the touch positions of the touch object at at least two moments;

obtain a first duration by calculating a ratio of the width of the display object in the first direction to the moving speed;

determine a reciprocal of the first duration as the modulation frequency; and generate the modulation signal according to the modulation frequency.

14. The haptic feedback device according to claim 13, further comprising at least one of:

an amplification circuit, wherein the amplification circuit is connected to the drive component and the actuator assembly respectively, and is configured to amplify the drive signal output by the drive component and send the amplified signal to the actuator assembly;

a first sensing component, wherein the first sensing component is arranged on one side of the touch display panel, and is configured to sense a pressure parameter of the touch object on the touch display panel and send the pressure parameter to the drive component, the pressure parameter comprises a touch pressure and/or parameters characterizing a magnitude of the touch pressure; and a second sensing component, wherein the second sensing component is arranged on one side of the touch display panel, and is configured to sense a deformation amount of the touch display panel due to a vibration driven by the actuator assembly, and send the deformation amount to the drive component.

15. The haptic feedback device according to claim 13, wherein a vibration mode adopted by the actuator assembly for driving the touch display panel to vibrate is a standing wave vibration mode.

16. The haptic feedback device according to claim 15, wherein a half-wavelength of the standing wave vibration mode is less than or equal to 20 mm.

\* \* \* \* \*